ELECTRONIC DIVIDER

INVENTORS
RAYMOND BIRD
PHILIP WOOD
BY Haane and Nydick
ATTORNEYS

INVENTORS
RAYMOND BIRD
PHILIP WOOD
BY Hane and Nydick
ATTORNEYS

Sept. 19, 1961 R. BIRD ET AL 3,000,563

ELECTRONIC DIVIDER

Filed Aug. 20, 1956 4 Sheets-Sheet 3

INVENTORS
RAYMOND BIRD
PHILIP WOOD
BY Kane and Nydick
ATTORNEYS

Sept. 19, 1961 | R. BIRD ET AL | 3,000,563

ELECTRONIC DIVIDER

Filed Aug. 20, 1956 | 4 Sheets-Sheet 4

INVENTORS
RAYMOND BIRD
PHILIP WOOD

BY Haseltine and Nydick
ATTORNEY 3,000,563

ELECTRONIC DIVIDER

Raymond Bird, Letchworth, and Philip Wood, Stevenage, England, assignors to International Computers and Tabulators Limited, London, England, a British company Filed Aug. 20, 1956, Ser. No. 604,884
Claims priority, application Great Britain Aug. 19, 1955
4 Claims. (Cl. 235—167)

The present invention relates to electronic calculating apparatus for performing calculations in the binary scale of notation and in particular to such apparatus adapted to perform division by repeated subtraction.

In apparatus for performing division by repeated subtraction of a divisor from a dividend provision has to be made for correction of over subtraction resulting in a partial remainder of negative sign. One method of effecting this correction is to add back when a negative partial remainder is produced so as effectively to go back one step in the calculation and continue with the remainder then subsisting by first shifting it one denomination and then subtracting the divisor from the shifted remainder. This method has the disadvantage that two cycles of operation are used and there is additional complexity in the quotient registering arrangements.

It is an object of the present invention to overcome these disadvantages and in accordance with the invention an electronic calculating apparatus for performing division by repeated subtraction on values represented in binary form, includes a plurality of storage devices, means interconnecting two of said devices and operable to permit transfer, with a shift of one denomination upwards in significance of a value from one of said two devices to the other, means for selecting, as a subtrahend, a value from either of said two devices in dependence upon the sign of the value in one of said devices, said selecting means being operative upon selection of a value from said one device to render operative said interconnecting means, means for initially entering the dividend in said one storage device, means for subtracting the divisor, from a subtrahend selected from said two storage devices, means for entering a partial remainder resulting from said subtraction in said one storage device to replace the value previously stored therein, and means for making an entry in a further storage device in dependence upon the sign of said partial remainder.

Figure 1:
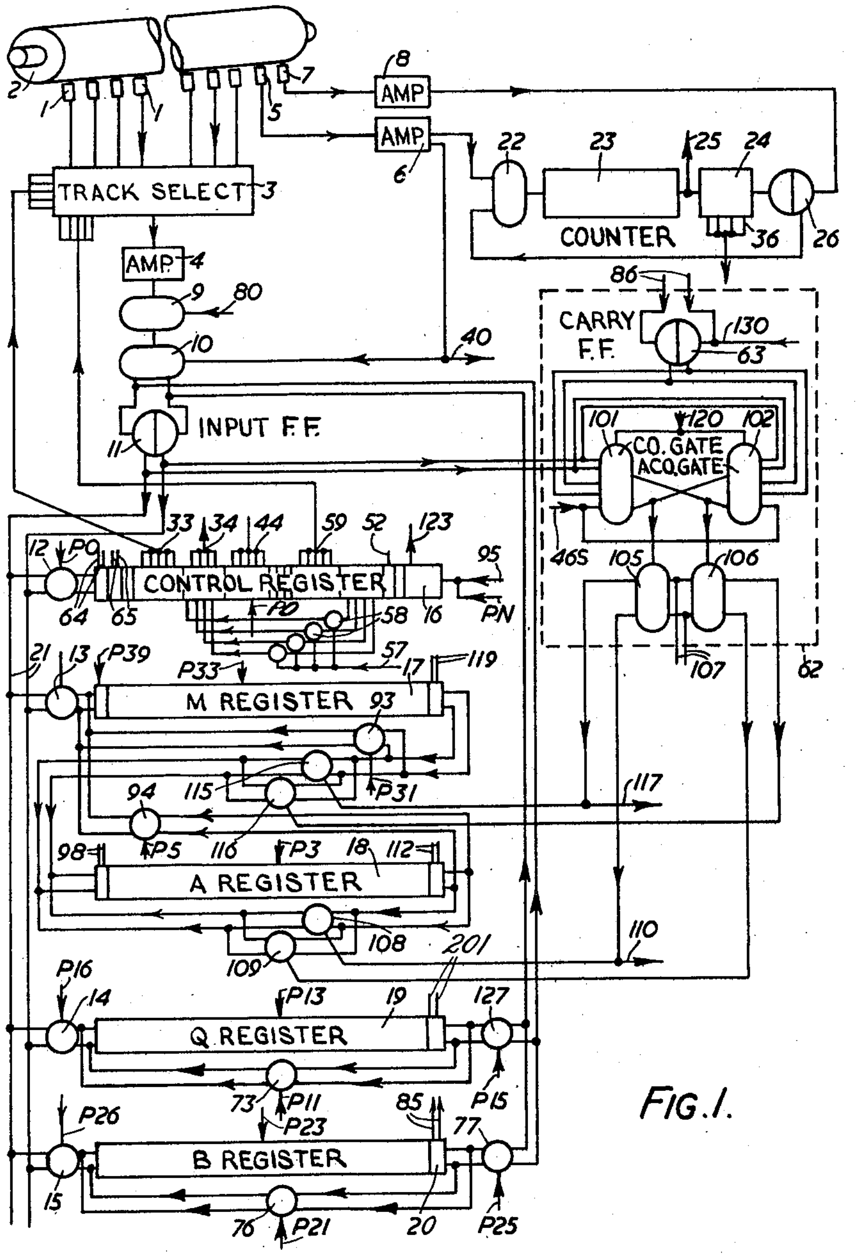
Figure 2:
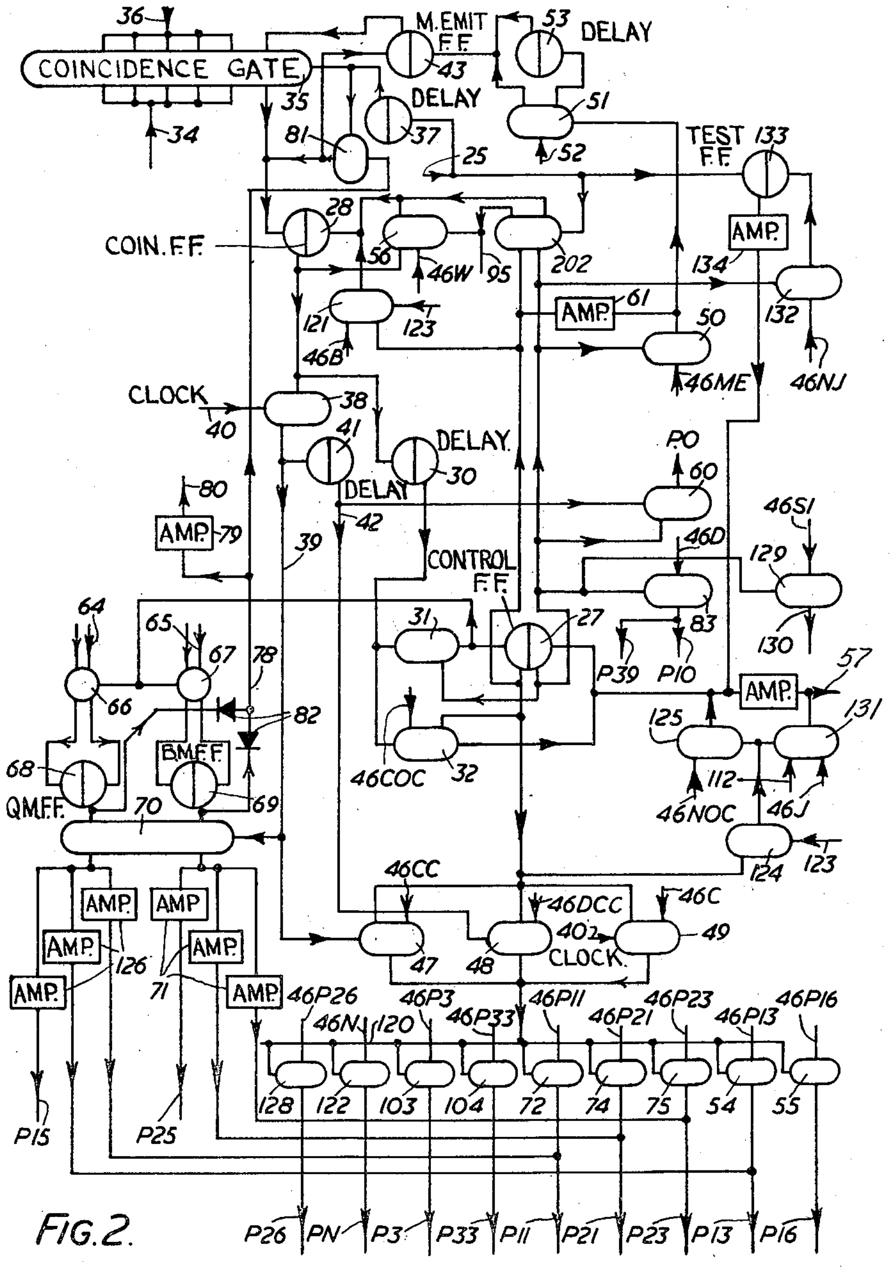
Figure 3:
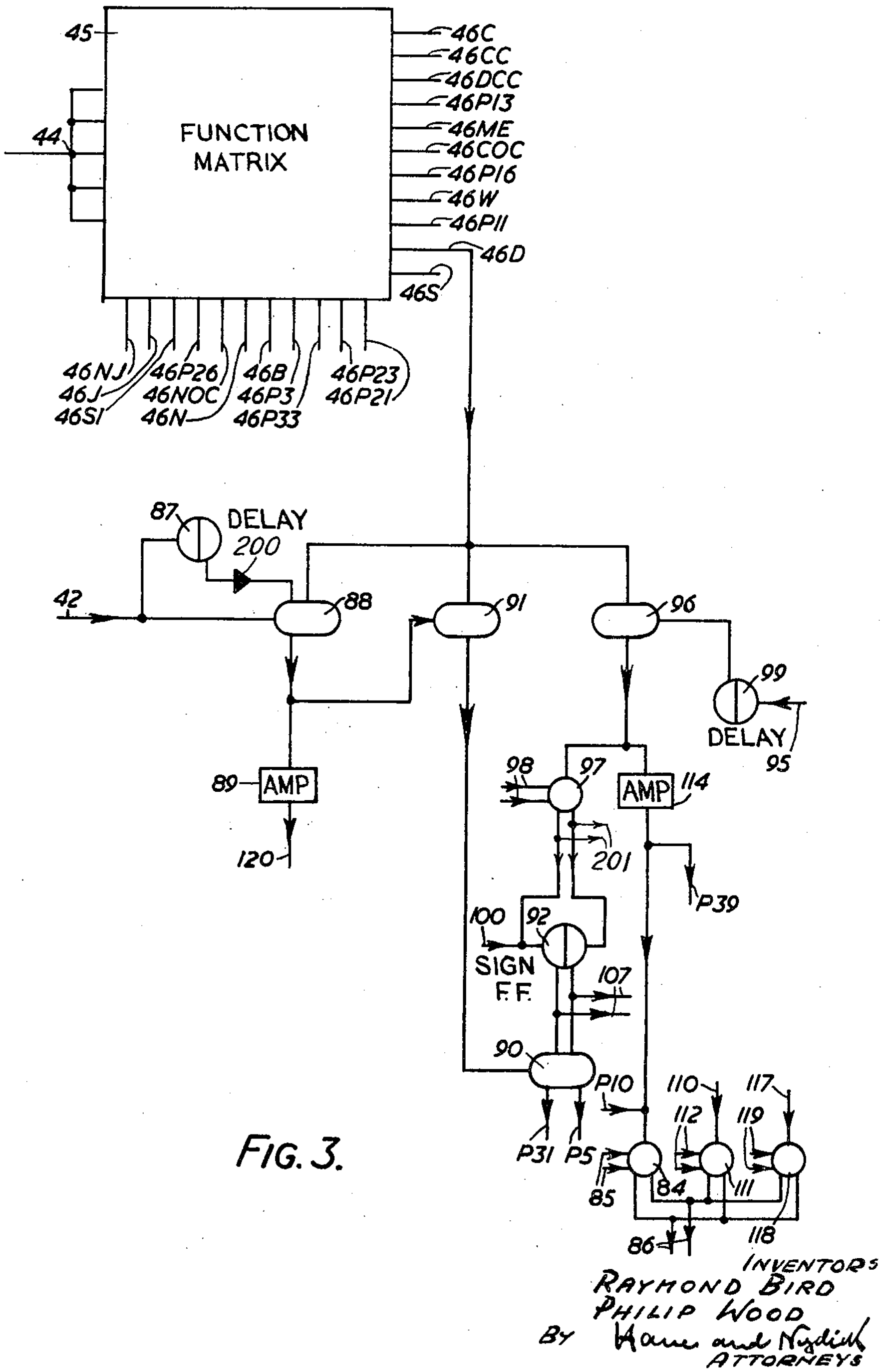
Figure 4:
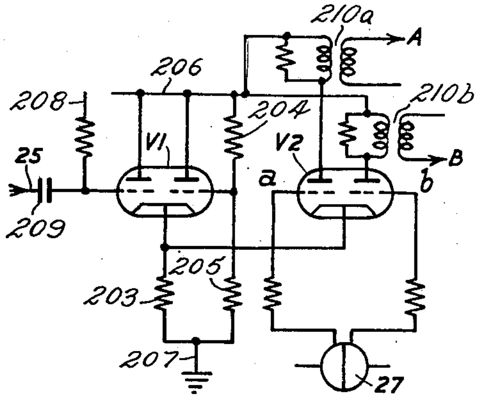
Figure 6:
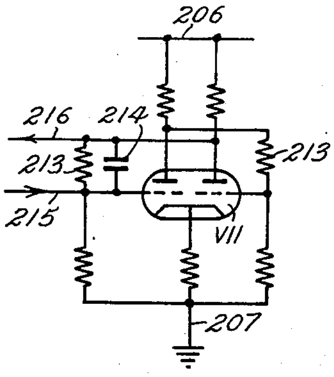
Figure 5:
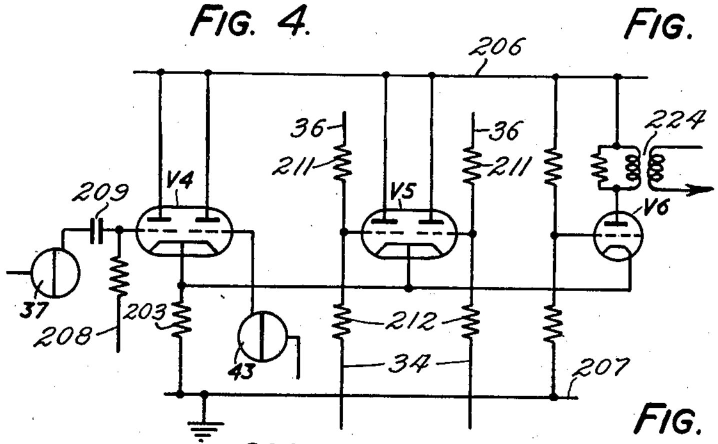
Figures 7, 8:
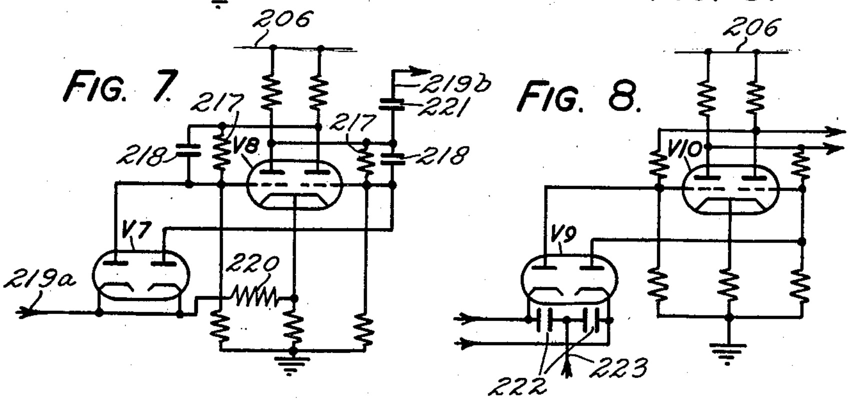

The invention will now be described with reference to the accompanying drawings of which:

FIGURES 1–3 comprise a block schematic diagram of an electronic calculating apparatus embodying the invention and FIGURES 4–8 show circuit details of the principal functional elements shown schematically in FIGURES 1–3, FIGURE 4 being the circuit of a gate such as gate 202, FIGURE 5 being the circuit of a coincidence gate such as gate 35, FIGURE 6 being the circuit of a delay trigger such as trigger 37, FIGURE 7 being the circuit of one stage of a counter and FIGURE 8 being one stage of a shifting register.

The calculator is designed to operate with a word length of forty binary digits which may represent a number or an instruction. All words are initially entered into and stored by a conventional magnetic drum storage device, and to perform a calculation a first instruction, which includes the address of the next instruction, is read out from the drum, registered in a control register and obeyed, the obeying of the instruction including preparatory control operations for the selection of the next instruction and so on.

An instruction word may be regarded as being made up of a series of parts each having a different significance as set out in the table below, the binary positions being numbered in sequence starting with the most significant.

| Binary Position | Significance |
|---|---|
| 1 | Used if the operand is in the register Q. |
| 2 | Used if the operand is in register B. |
| 3 | Not used. |
| 4–9 | Magnetic drum store track selection. |
| 10–13 | Magnetic drum store word selection. |
| 14–18 | Function to be performed. |
| 19 | Used if the next instruction is in register Q. |
| 20 | Used if the next instruction is in register B. |
| 21 | Not used. |
| 22–27 | Track selection for next instruction. |
| 28–31 | Word selection for next instruction. |
| 32 | Track delay. |
| 33 | Optional stop. |
| 34–40 | Function counter control. |

The registers Q and B referred to in the table are two of four temporary stores or shifting registers provided in the calculator to accommodate initial, intermediate and terminal factors involved in a calculation, the initial factors being derived from the magnetic drum and the intermediate and terminal factors being derived by performing arithmetical operations on the initial factors.

The arithmetical operations of which the calculator is capable are performed by circulating numbers into and out of the various registers and through an adder/subtractor circuit of the type described and claimed in British Patent No. 738,269, in accordance with the instructions read out from the drum or in accordance with the result obtained from a previous circulation, as the operation may require. The circulation is effected by the application of appropriate trains of shift pulses derived and distributed by a control circuit which is itself controlled in dependence upon each instruction from the drum as it appears in the control register.

Referring now to FIGURE 1 the magnetic drum store is indicated schematically at 2 and it has a number of magnetic heads 1 and a head 5 and a head 7 for reading on to and from the drum surface. The size of the drum 2 is such that it can accommodate sixty four tracks side by side and each track can be used for recording sixteen forty digit words with a space between each word and the next equal to eight digit positions. Sixty two of these tracks have an associated head 1 but for convenience of illustration only a small number are shown in FIGURE 1.

Selection of a particular one of the heads 1 to read from its associated track is effected by a track select unit 3 which comprises a tree of relay contacts the associated relays of which are arranged to be controlled from the control register. The output from this unit, of which there may be more than one, feeds an amplifier 4, the output of which is gated by a gate 9 in a manner later to be described.

The head 5 reads a track on which are recorded signals corresponding to all the desired recording positions on the other tracks associated with the heads 1 and thus reads pulses, hereinafter referred to as clock pulses, in trains of forty to an amplifier 6. This amplifier drives a counter 23, 24 through an input gate 22 which is controlled in dependence upon the set or unset condition of a bistable trigger 26 at the output end of the counter. This trigger is arranged to be set by an output pulse from the counter and unset by a pulse read from the drum by head 7 and passed through an amplifier 8 to the trigger 26. The drum track associated with head 7 has a single signal recorded on it from which the head 7 reads out a pulse for each revolution of the drum. This pulse will hereinafter be referred to as an end of revolution pulse.

The counter is in two parts 23 and 24, part 23 being arranged to count up to forty and deliver an output pulse, referred to as an end of word pulse, on line 25 and to the input of the second part 24 of the counter which is arranged to count up to sixteen and pass an output pulse to the trigger 26.

It will thus be seen that the counter section 24 provides at all times a registration of the number of words which have been read since the beginning of a drum revolution by the heads 1 and its synchronisation with the drum is checked at each revolution by virtue of the fact that the opening of the input gate 22 to the counter is made dependent upon the application of an end of revolution pulse to the trigger 26 to unset the latter after it is set by the output pulse delivered by counter section 24 upon counting 16 words.

This registration of the number of the words read enables the selection of a single word from a track selected by the unit 3 in the following manner.

Assuming that an instruction has been shifted into the control register 16, that part of the instruction in positions 4–9 of the register will control the selection of the appropriate track over lines 33 and that part of the instruction in positions 10–13 will set a coincidence gate 35 (FIGURE 2) over lines 34. The registration in section 24 of the counter is also applied, over lines 36, to gate 35 which is arranged to open when there is coincidence between the settings applied over lines 34 and 36 respectively. The registration in section 24 of the counter, being effected by an end of word pulse, indicates the number of complete words which have been traversed by the heads 1 at any instant, but by numbering the word positions one ahead of their actual positions relative to the beginning of a drum revolution, this registration can be used to indicate the word currently being traversed by the heads. Since there is an eight digit position gap between words on each track the registration is set up sufficiently in advance of the actual reading of a word by its associated head for circuits to be prepared to receive the digits read out by the head.

Thus eight digit positions in time before a desired word is read out the registration in section 24 of the counter agrees with the word number stored in positions 10–13 of the control register and the coincidence gate 35 is opened. At the end of the word the application of the end of word pulse from section 23 to section 24 of the counter destroys the agreement between the two registrations and gate 35 is thus closed.

The end of word pulse which brought about agreement between the registrations applied to gate 35 is also applied over line 25 to set a monostable delay trigger 37 which unsets after a delay of five and one half digit times to provide an output pulse which is applied to the open coincidence gate 35 and passes through this gate to switch a coincidence flip flop or trigger 28. A gate 38 to which clock pulses from amplifier 6 (FIGURE 1) are applied over line 40, is controlled by trigger 28 to pass the applied clock pulses to line 39 and, via a monostable delay trigger 41, which produces a delay of approximately three quarters of a digit time, to line 42. The pulses on line 39 and line 42 only occur when the coincidence trigger 28 is switched and will therefore be referred to as coincidence clock pulses and delayed coincidence clock pulses respectively to distinguish them from the trains of clock pulses on line 40.

The lines 39, 42 and 40 carrying their respective pulses are connected to input gates 47, 48 and 49 respectively of a distributing arrangement made up of the gates 128, 122, 103, 104, 72, 74, 75, 54 and 55 so that by selectively operating the input gates 47, 48, 49, and the distributor gates any one of the three different types of pulse train can be fed out through the distributing arrangement to act as shift pulses to control circulation of information through and around the shift registers or temporary stores 17, 18, 19 and 20 (FIGURE 1).

When it is required to select and read out a word, the gate 9 is opened in a manner described later and the pulses from the selected head 1 are amplified by the amplifier 4, pass through gate 9 and are applied to gate 10. This gate has two outputs and is controlled by clock pulses from amplifier 6 over line 40 so as to provide a pulse at one output in response to each binary 1 digit read out and a pulse at the other output for each binary 0 digit read out. The pulses from the outputs of gate 10 are applied to set and unset a bistable input flip flop or trigger 11 the output of which is applied to highway 21.

The control register 16 and each of the storage registers 17, 19 and 20 are connected to highway 21 through an associated input gate, the respective gates being gates 12, 13, 14 and 15 which are selectively opened to allow the pulses on highway 21 to enter their associated registers in accordance with the instruction being obeyed. The movement of the digits of a word along the stages of register into which it is being entered is effected by a train of shift pulses from the distributing arrangement described above applied to the shift input to the register.

Thus if an instruction calls for the transfer of a word from a specified drum location into register 19, the input gate 14 of this register would be opened by a train of pulses from the distributing arrangement over line P16 and a similar train of pulses over line P13 would shift the digits along the register as they are fed into the first stage from highway 21 through gate 14.

The end of word pulse appearing on line 25 after the forty digits of the selected word have been read out cannot pass through the coincidence gate which is closed before the delay imposed by delay trigger 37 has expired but it does pass through a gate 202 to one or other of the outlets of this gate in dependence upon how the gate is conditioned, either directly to the coincidence trigger 28 to unset it or through a further gate 56 to unset trigger 28. In either case trigger 28 closes gate 38 to terminate the application of clock pulses to line 39, and the application of delayed clock pulses to line 42.

It will be appreciated that a number read out from the magnetic drum and entered into one of the registers is thereafter available from either the drum which has an appreciable access delay or the register which is of immediate access type when it is required for the purpose of further arithmetical operations, and arrangements are provided in the calculator for selecting such a number from either location as may be most convenient. As previously mentioned the form of instruction used includes positions at which an indication can be registered that the operand is a word in the Q or B register i.e. registers 19 and 20. When an instruction including such an indication is entered into the control register 16 the indication is applied, over lines 64 or 65 to gates 66 or 67 (FIGURE 2) respectively.

When the coincidence trigger 28 is unset by an end of word pulse it produces an output pulse which is delayed by three digit times by a delay trigger 30 and then applied to two gates 31 and 32. These gates are controlled by a control flip flop or trigger 27, the operation of which will be described later, and with this trigger switched to open gate 31 the pulse applied to that gate passes through and is applied in common to gates 66 and 67. In dependence upon which of lines 64 and 65 carries the indication referred to above so one of the gates 66 and 67 passes the pulse applied to it from gate 31 and switches an associated memory flip flop or trigger 68 or 69.

The output of these memory triggers is applied to a gate 70 and a connection from the output lines is made through diodes 82 to line 78 so that when either trigger is set the voltage on this line changes and through an inverting amplifier 79 this change is applied over line 80 to close gate 9 (FIGURE 1) in the input circuit from the magnetic drum to highway 21. Read out from the drum is thus blocked and the required number is read out of the B or Q register in the following manner.

The voltage on line 78 is applied to open a gate 81 which receives the delayed end of word pulse applied to the coincidence gate 35 and such pulse passes through gate 81 to set the coincidence trigger 28 and thus open gate 38 to admit clock pulses to line 39. These clock pulses are applied to gate 70 and appear at one or other of its outputs in dependence upon whether the Q memory trigger 68 or the B memory trigger 69 has been switched. With trigger 68 switched these clock pulses are applied through amplifiers 126 to lines P15, P13 and P11. With trigger 69 switched the pulses are applied through amplifiers 71 to lines P25, P21 and P23.

The clock pulses on P13 shift the contents of the Q register, on P15 they open gate 127 to allow the shifted contents out on to a highway leading to the input side of input trigger 11, and on P11 they open gate 73 to allow circulation of the shifted contents back into register Q. Similarly the pulses on lines P25, P21 and P23 would operate the shift and open gates 76 and 77 of the B register.

The effect therefore of an instruction to read an operand from the B or Q register instead of from the drum is to block the drum read out circuit and by-pass the coincidence gate and distributing arrangement by means of gates 81 and 70.

The operation of the control trigger 27 will now be described as it applies to the start of a calculation. Assuming that all the numbers and instruction words have been entered into the magnetic drum store 2, control trigger 27 is set e.g. by a pulse from the input mechanism (not shown) so that its right hand output opens gates 31, 60 and the righthand output of gate 202. The setting of trigger 27 produces a pulse which passes through a gate 50 held open at this time by a potential on line 46ME from a function matrix (FIGURE 3), which will be described later, and this pulse is applied to gate 51.

Gate 51 is controlled over line 52 from position 32 of the control register 16 in such a manner that a binary "0" in this position opens the left hand output of gate 51 and a binary "1" opens the right hand output. Thus the applied pulse is passed to set a memory emit flip flop or trigger 43, either directly or via a delay trigger 53 which provides a delay of five milliseconds to allow for track switching operations, and this trigger 43 controls the opening of gate 35 upon coincidence being reached.

Since at the commencement of an operation the control register is clear of any entry it does in effect have the address track 0, word 0 registered in it and the word number is applied over lines 34 to the coincidence gate 35 so that when the head 1 of track 0 finishes reading the word preceding word 0, counter section 24 also registers the same word number and gate 35 is opened to pass the delayed end of word pulse from line 25 and through trigger 37 to set the coincidence trigger 28 as previously described. The resultant train of delayed coincidence clock pulses on line 42, in addition to being applied to gate 48, is applied to a gate 60 held open at this time by trigger 27 and thus passes over line P0 to open the input gate 12 (FIGURE 1) of the control register 16 so as to admit into this register from highway 21 the instruction currently being read from the drum 2. The line P0 also applies these pulses as shift pulses to register 16 so that the instruction is shifted along the register as it is admitted into it.

At the end of the instruction word an end of word pulse appears on line 25 and is applied to gate 202 which is controlled by control trigger 27 to pass the end of word pulse through its right hand output to unset the coincidence trigger 28. In unsetting trigger 28 produces a pulse which is applied to set a delay trigger 30 which, after three digit times unsets to produce an output pulse which is applied to gates 31 and 32. These gates are controlled by the two outputs of the control trigger 27 and gate 31 is open with trigger 27 in its present state so that three digit times after the occurrence of the end of word pulse on line 25 the pulse from delay trigger 30 passes through gate 31 to switch the control trigger over to its other state. In this other state the control trigger 27 allows performance of the instruction previously read into the control register 16.

It will be recalled that the function to be performed is registered in positions 14–18 of the control register. These positions are connected by lines 44 to a diode function matrix 45 (FIGURE 3) of conventional type which serves to change the voltage level on different combinations of a plurality of output lines, designated with the common prefix 46, in accordance with different combinations of settings of the control register stages 14–18. A function matrix of this kind is described on page 444 of "Electronic Engineering" for October 1952. The gates forming the pulse distributing arrangement of FIGURE 2 are controlled by the function matrix over these output lines 46 to distribute gate opening and shift pulse trains to the various registers 17 to 20 of FIGURE 1 required to perform a function. As mentioned previously these pulses are supplied to the distributing arrangement through gates 47, 48 and 49 which are controlled in common by the unset output of control trigger 27 and individually by the function matrix over lines 46CC, 46DCC and 46C respectively. Thus the condition of trigger 27 determines whether any of the gates 47, 48 and 49 is to pass their respective pulse train to the distributing gates and the function matrix determines which of gates 47, 48 and 49 is to open.

Upon completion of operation of obeying the instruction in the control register, a further end of word pulse appears on line 25 and passes through to the left hand output of gate 202, since the control trigger 27 is currently unset, and is applied to a gate 56 controlled from the function matrix over line 46W and by the set output of the coincidence trigger 28. Gate 56 being open at this time the pulse is applied to unset the coincidence trigger 28 the resultant output from which closes gate 38 and sets delay trigger 30. The delayed end of word pulse from trigger 30 cannot now pass through gate 31 which is held closed by control trigger 27 but passes instead through gate 32 which is held open jointly by trigger 27 and by the function matrix over line 46COC. From the output of gate 32 the pulse passes to switch the control trigger 27 to its set state in readiness for reading in the next instruction. Also the pulse from the output of gate 32 is amplified and passes over line 57 to a set of four gates 58 (FIGURE 1) in a transfer circuit between stages 28 to 31 and stages 10 to 13 of the control register 16. The opening of gates 58 allows the resetting of positions 10 to 13 to the register into agreement with the setting of stages 28 to 31 so that address of the next instruction is applied to the coincidence gate 35 over lines 34 and the selection of the instruction at the new address can proceed in the manner previously described.

The machine is also provided with arrangements for controlling repeated performance of a single instruction and with a number of ancillary control circuits for controlling the performance of a division operation and these arrangements and circuits will now be described, and their interworking with the arrangements already described will be explained, in the following outline of a division operation.

In the machine being described, all numbers on which calculations are performed are initially converted into binary fractions having the binary point at the extreme left-hand end by multiplying each number by a factor $2^{-n}$, where $n$ is sufficiently great to ensure that the numbers remain binary fractions throughout the calculation. With this method, the programmer knows what correction he has to programme into the read-out routine in order that the answer to the calculation is correctly printed out from the machine.

In the case of division, three possibilities exist.

(*a*) The dividend is known to be less than the divisor as contained in the appropriate register: in this case the programmer can write the programme so that it is possible to proceed with division merely by the use of the "divide" instruction.

(*b*) The dividend is known to be greater than the divisor by a certain number of binary places (powers of 2): in this case the programmer includes a preliminary instruction to shift the divisor by the appropriate number of places for it to exceed the dividend. This is done by a shift instruction in which stages 34–40 of CR (which is the instruction register) are set to the number which controls the shifting. In this case the programmer, since he knows how many stages of shifts are performed knows the correction necessary for inclusion in the read-out routine.

(*c*) The relative magnitude of dividend and divisor are not known: in this case it is necessary to test the relative magnitude of the two values, and apply a shift to the divisor if it is smaller. The "test and shift" sub-routine is continued until the divisor exceeds the dividend. The number of such shifts must be counted, and the result of the count used to control read-out. Here the programmer includes a "test-and-shift" sub-routine as a preliminary stage in his programme.

The division operation proper is initiated by a "divide" instruction which contains, in positions 34–40, a value which controls the number of subtraction cycles to be done to perform division. This is entered into stages 34–40 of CR when the instruction reaches CR, and cannot exceed 39. However, it is undesirable to perform the full number of cycles in every case, which would often give the final result to an unnecessary accuracy, e.g. of the calculation deals with sterling pence it will usually be unnecessary to give the final result to several places of decimals. Hence the programmer, who knows the degree of accuracy needed, determines therefrom the number to be entered into positions 34–40.

Thus the sequence of instructions needed to do a division is:

(i) Instruction or instructions to shift the dividend and the divisor into the A and B register respectively, if they are not already there.

(ii) Shift instruction, or shift-and-test sub-routine, if necessary to ensure that the divisor exceeds the dividend.

(iii) The "divide" instruction proper.

These preliminary measures are effected as follows. The divisor is read out from the magnetic drum 2 and entered into the Q register in response to a first instruction and the next instruction to be entered into the control register is "shift the contents of Q" by the predetermined number of stages. Positions 34 to 40 of this instruction contain the binary equivalent of a number which is the difference between thirty nine and the number of stages the divisor is to be shifted and these stages of the control register are arranged to operate as a subtracting counter.

The control register setting causes the function matrix FIGURE 3 to raise the potential on lines 46P11, 46P13, 46C, 46N and 46NOC, thus opening, or conditioning for opening, gates 72, 54, 49, 122 and 125. Gate 49 admits clock pulses from line 40 to gates 72 and 54 which pass them over lines P11 and P13 to open gate 73 in the circulation loop of register 19 (the Q register) and to shift the contents of this register one place for each clock pulse. The pulses admitted by gate 49 also pass through gate 122 held open by the potential on line 46N and are applied over line PN to the last stage of the control register 16. If it is assumed that a shift of five places is required the setting in 34 to 40 of register 16 will be the binary equivalent of thirty four (thirty nine less five) so that the thirty-fifth clock pulse will cause the counter section of register 16 to pass through zero and deliver an output pulse on line 123.

This output pulse passes through a gate 124 (FIGURE 2), which is held open by the control trigger 27, and through gate 125, held open by the potential on line 46NOC, to switch the control trigger 27 and thus cut off the supply of clock pulses through gate 49. The pulse also passes over line 57, to open gates 58 to transfer the address of the next instruction word from positions 28–31 to positions 10–13 of the control register 16.

The Q register thus receives thirty five shift pulses so that its contents, the divisor, is in effect shifted five positions to the left, and the remaining preparatory step is to transfer the divisor from the Q register to the B register where it is normally positioned at the beginning of a division operation. This transfer is effected by the next instruction and since it relates to a number in the Q register the instruction includes a binary "1" in position 1. As previously explained, this has the effect of setting the Q memory trigger 68 and the resultant potential on line 78 opens gate 81 to pass the delayed end of word pulse from trigger 37 to set the coincidence trigger 28. Coincidence clock pulses on line 39 as a result of the opening of gate 38 by trigger 28 pass through to the left hand output lines of gate 70 to lines P11, P113 and P15 through amplifiers 126.

The setting of the function matrix in response to this instruction raises the potential on 46P23, 46P26, 46DCC, 46W and 46COC and thus opens, or conditions for opening, gates 75, 123, 48, 56 and 32. The opening of gate 48 admits delayed coincidence clock pulses to gates 75 and 128 and thus to lines P23 and P26 respectively so that coincidence clock pulses shift the contents of the Q register through gate 127 to the input of the input trigger 11 and also through gates 73 back into the Q register, and delayed coincidence clock pulses admit the output of trigger 11 on highway 21 through gate 15 into the B register, the output being shifted along the B register by the pulses on line P23.

The opening of gates 56 and 32 allows switching of the coincidence trigger 28 and the control trigger 27 by the next end of word pulse as previously described. The value remaining in the Q register may be cleared by a conventional zeroing circuit if it is desired to commence the division operation with an empty Q register. The operations which have been described briefly above will now be described in more detail.

In order to perform either a division operation proper or the subtraction operation, previously referred to, in order to ascertain whether the divisor is larger than the dividend, it is first necessary to enter the dividend into the A register 18. As will be seen from FIGURE 1, values may be transferred from the drum to the M, B and Q registers, and between these registers by way of the input flip-flop in response to appropriate instructions. However, in order to enter a value into the A register it is first necessary to enter the value into the M register since the A register has no direct path available from the lines 21. The A and M registers may then be connected to form a large recirculating register by the opening of gates 94 and 115 in response to an appropriate instruction. This instruction also causes 40 shift pulses to be applied to shift inputs P3 and P33 of the registers, with the result that the contents of the A and M registers are mutually transferred.

Where it is necessary to shift the divisor and then test that it is larger than the dividend before division proceeds the test is effected by subtracting the divisor from the dividend and determining the sign of the remainder, the dividend having been entered into the appropriate register under control of a previous instruction in a manner similar to that already described. The instruction for subtraction sets the function matrix to raise the potential on lines 46S, 46P3, 46DCC, 46ME, 46W, 46COC and 46S1.

The line 46S conditions an adder/subtractor 62 (FIGURE 1) for subtraction and the lines 46P3 and 46DCC open gates 103 and 48 to allow delayed coincidence clock pulses to be applied to the adder 62 over line 120, and to the A register, in which the dividend is located, over line P3. Line 46ME opens gate 50 to admit the switching pulse from control trigger 27 to gate 51 as previously described, line 46W opens gate 56, line 46COC opens gate 32 and line 46S1 opens a gate 129 which passes the switching pulse from control trigger 27 over line 130 to the carry flip flop or trigger 63 of the adder 62 (FIGURE 1).

Since the divisor is in the Q register the instruction has a binary "1" in its first position and the Q memory trigger 68 is set to open the left hand side of gate 70 and provide shifting pulses for the Q register as described above. As each digit of the divisor is circulated from the Q register via the input trigger 11 and highway 21 back into the Q register, it is applied to the coincidence and anticoincidence gates 101 and 102 of the adder 62. Also as each digit of the dividend reaches the last stage of the A register it is applied over lines 112 and via gate 111 (FIGURE 3) and lines 86 to the carry trigger of the adder 62. The output from the adder controls the gates 108 and 109 in the circulation loop of the A register to effect direct shift or shift with reversal, of each digit of the dividend in dependence upon the result of the comparison which is effected in the adder. Thus the remainder resulting from subtracting the divisor from the dividend is entered into the A register. If the divisor was larger than the dividend the remainder will be a negative quantity i.e. the first stage of the A register will contain a binary "1" and this condition is tested for in the next instruction.

With the test instruction in the control register 16 the function matrix raises the potential on lines 46P3, 46N, 46C, 46J and 46NJ. Lines 46P3 and 46C open gates 103 and 49 to apply clock pulses from line 40 over line P3 to circulate the contents of the A register. Line 46N opens gate 122 to allow these pulses to be fed to the counter stages of the control register over line PN. The instruction includes an entry of thirty eight in these counter stages so that the thirty ninth clock pulse over line PN causes the counter to pass through zero and give an output pulse on line 123 which pulse passes through gate 124 (FIGURE 2) to gates 125 and 131. Gate 125 is held closed by the potential on line 46NOC but gate 131 is arranged to be opened by the potential on line 46J in conjunction with the potential on line 112 if a binary "1" is registered in the last stage of the A register after a shift of thirty nine places i.e. if the value in the A register is negative.

If the value is negative the gate 131 will pass the pulse to the line 57 so as to effect the transfer of the next instruction address from stages 28–31 to stages 10–13 of the control register as previously described.

The switching of the control trigger 27 before the test is carried out generates a pulse which is applied to gate 132 held open by the potential on line 46NJ and this pulse passes through gate 132 to set a test flip flop or trigger 133. After the test is completed the end of word pulse on line 25 unsets trigger 133 which in unsetting produces a pulse which is applied via an amplifier 134 to switch the control trigger 27.

If the remainer is positive the most significant digit will be a binary "0" and the potential on line 112 will hold gate 131 closed so that the next instruction address is not transferred, and when the control trigger is switched at the end of the test it will transfer to the control register the instruction specified by positions 10–13 of the control register. This instruction may be to shift the divisor a predetermined number of places with a repeat of the subtraction and test at the end of the shift operation.

With these preliminary operations completed the actual division operation can be effected. At the outset of a division operation the divisor and dividend are respectively positioned in B and A registers and the general outline of operation is as follows. As a first step the dividend is effectively shifted one digit to the left and the divisor is subtracted from it to produce a partial remainder, which may be either positive or negative and which is stored in the A register. At the same time the original dividend is shifted into the M register. If the partial remainder is positive, then "1" is entered into the appropriate position in the Q register, which is used to hold the quotient, and the divisor is subtracted from the first partial remainder with another effective left shift to form a second partial remainder. At the same time the first partial remainder is shifted from the A register into the M register, replacing the number already there.

This continues so long as the partial remainder is positive. When it is negative "0" is entered into the Q register and the divisor is subtracted, not from the last partial remainder in the A register, but from a previous remainder which is now in the M register. During each subtraction the remainder is effectively shifted one digit to the left, including the remainder in the M register.

It is not known at the commencement of each step what will be the sign of the next remainder. It is therefore necessary to store each positive remainder, including the initial dividend, until the next positive remainder occurs. To effect this storage, each positive remainder is transferred from the A register to the M register with a one digit left shift. The value in the M register is, therefore, only used when the partial remainder is negative. The alternate shifting and subtraction of the divisor from the contents of the M register continues so long as successive remainders are negative. When the next positive remainder occurs it will be used as the new value for the register. In this way the last positive remainder is available without having to recreate it from a negative remainder by an add-back cycle.

The left shift is achieved by applying the first shift pulse to the B register only and the remaining thirty nine pulses to all four registers 17–20. The first pulse shifts the value in the B register one digit right in relation to the values in the other three registers and thus effectively shifts the latter values one digit left in relation to the value in the B register. The circulation of the value in the B register by forty shift pulses for subtraction purposes, and the effective left shift are thus effected in one word time and the subtraction of digit 40 of the B register from the last digit of the value in the A register is effected by setting the last digit of the A register, at the end of each subtraction, to agree with the last stage of the B register.

A positive remainder is indicated by a "0" in the first stage of the A register (referred to as A1) and a negative remainder by a "1." As the respective quotients are "1" and "0" they can be formed by shifting A1 into the last stage of the Q register (Q40).

As an example of the method of division, the division of 2 by 3 is set out below. For brevity the contents of the first four and last four stages only of each register are shown.

Before first subtraction:
M 0000 . . . 0000
A 0000 . . . 0010 dividend
Q 0000 . . . 0000
B 0000 . . . 0011 divisor After first subtraction:
M 0000 . . . 0100 previous A with left shift
A 0000 . . . 0001 remainder
Q 0000 . . . 0001 Q40=A1 reversed
B 0000 . . . 0011 divisor After second subtraction:
M 0000 . . . 0010 previous A with left shift
A 1111 . . . 1110 negative
Q 0000 . . . 0010 Q40=A1 reversed
B 0000 . . . 0011 divisor After third subtraction:
M 0000 . . . 0100 previous M with left shift
A 0000 . . . 0001 positive
Q 0000 . . . 0101 Q40=A1 reversed
B 0000 . . . 0011 divisor And so on until after the thirty-ninth subtraction:

M 0000 . . . 0010 previous A with left shift
A 0000 . . . 0001 final remainder
Q 0101 . . . 0101 final quotient
B 0000 . . . 0011 divisor With the instruction to divide entered in the control register the function matrix raises the potential on its lines 46P11, 46P13, 46P33, 46P3, 46S, and 46D thus opening gates 72, 54, 103 and 104 to admit pulses to lines P11, P13, P33 and P3, conditioning the adder 62 (FIGURE 1) for subtraction, and opening gate 83. Lines P11 and P13 control gate 73 in the circulation circuit of register Q and apply shift pulses to this register, respectively, and lines P33 and P3 apply shift pulses to the A and M registers.

Since the operand is in the B register the instruction has a binary "1" in its second position and this, as previously explained, has the effect of setting the B memory trigger 69 thus opening the right hand side of gate 70 to admit pulses from line 39 to lines P25, P21 and P23. These lines control gate 77 between the output of the B register and the input of trigger 11 and gate 76 in the circulation circuit of the B register, and apply shift pulses to the B register respectively. The potential on line 78 as a result of the setting of trigger 69 by-passes the coincidence gate by means of gate 81 and blocks the input from the drum 2 to the trigger 11 by closing gate 9.

When the control trigger is switched to the state to obey the instruction a pulse is fed to gate 83, held open by the potential on line 46D, and passing through this gate is fed via line P39 to the first stage of the M register to set it to zero. The same pulse is fed via line P10 to a gate 84 (FIGURE 3) which is connected by lines 85 to the last stage of the B register and by lines 86 to the carry trigger 63 of the adder 62. The effect of the pulse is to set trigger 63 to the inverse of the setting of the last stage of register B.

Delayed coincidence clock pulses on line 42 are applied to a gate 88 (FIGURE 3) and to a monostable trigger 87 which in conjunction with the potential on line 46D controls the opening of gate 88. An integrating circuit 200 between the trigger 87 and the gate 88 introduces a delay of one digit time and the trigger 87 is arranged to unset two digit times after being set so that the first of the clock pulses on line 42 fails to pass through gate 88 but the remaining 39 pass due to the gate being held open by the repeated pulsing of trigger 87.

The output of gate 88 is connected via an amplifier 89 and line 120 to the distributing arrangement of FIGURE 2 so as to be in common with the output lines from gates 47, 48 and 49. Thus the train of thirty-nine delayed coincidence clock pulses is applied over lines P11 and P13 to circulate the contents of the Q register and shift them one denomination for each train of pulses. This output from gate 88 is also applied to a gate 91 held open by the potential on line 46D and pass to a gate 90 which is controlled by a sign flip-flop or trigger 92. This trigger 92 is set in accordance with the sign of the value in the A register so that either the right hand or left hand side of the gate 90 is opened in dependence upon whether the value in the A register is positive or negative.

If such sign is negative the thirty nine pulses from gate 88 pass through the left hand side of gate 90 over line P31 which controls a gate 93 (FIGURE 1) in the circulation circuit of the M register. These pulses thus cause the value in the M register to be circulated through the register and being thirty nine in number effectively left shift the value by one digit.

If, however, the sign is positive the right hand side of gate 90 is open to apply the thirty nine pulses to line P5 which controls a gate 94 (FIGURE 1) to allow the output of the A register to be entered into the M register.

The setting of the sign trigger 92 is effected as follows. An end of word pulse passed by gate 202 to gate 56 is also fed to a delay trigger 99 (FIGURE 3) over line 95. After a delay of one and a half digit times trigger 99 unsets and applies a pulse to gate 96 which is held open by the potential on line 46D so that the pulse passes to the input of gate 97 the output of which is connected to the sign trigger 92. Gate 97 is controlled over lines 98 by the setting of the first or sign indicating stage of register A so that after the end of word pulse the sign trigger 92 is set by gate 97 to correspond to the sign of the value in the A register. By means of a connection 201 from the output lines of gate 97 to the last stage of the Q register such stage is set to correspond to the inverse of the setting of the first stage of the A register at each end of work pulse so as to build up the quotient value in the Q register, as the operation proceeds.

At the beginning of the division operation it is assumed, or it is ensured, that the sign of the dividend is positive and this is registered on the sign trigger 92 by applying a delayed output pulse from the coincidence trigger 28 to trigger 92 over line 57.

The line 120 (FIGURE 3) carrying the thirty nine clock pulses is connected to the coincidence and anti-coincidence gates 101 and 102 of the adder 62 (FIGURE 1) which gates are controlled by the carry trigger 63, the input trigger 11 and the matrix line 46S. If the settings of the input and carry triggers are the same, gate 101 is opened to pass a pulse from line 120 to gate 105, and if the settings are unlike gate 102 is opened to pass the pulse to gate 106. Gates 105 and 106 are controlled by the sign trigger 92 (FIGURE 3) over lines 107 and under the condition at the beginning of division i.e. with the sign trigger indicating positive sign, a pulse applied to gate 105 passes through to gate 108 and a pulse applied to gate 106 passes through a gate 109. Gates 108 and 109 are connected between the output and input of the A register and as previously mentioned serve to shift the digits of the A register value directly or with inversion.

Each pulse passed by gate 105 is also fed over line 110 to a gate 111 (FIGURE 3) which is connected between the output of the A register and the carry trigger 63 of the adder so that each pulse switches the carry trigger to the same setting as the last stage of the A register. The gates 108, 109 and 111 set the first stage of the A register and the carry trigger 63 in accordance with the rules of subtraction set out in the British Patent No. 738,269 referred to above.

Thus at the end of the first subtraction the divisor has been shifted forty positions round register B and is back in its original position, the dividend has been shifted thirty nine positions and into the M register so as to have been effectively left shifted one position and the first partial remainder is in the A register. It will be appreciated that if preliminary shifting of the divisor was effected it would be shifted from the Q register in which it is located for preliminary shifting into the B register by an instruction preceding the instruction to divide.

The end of word pulse following the first subtraction is passed through the left hand side of gate 202 and on to line 95 which applies the pulse to the counter end of the control register 16 and to the delay trigger 99 (FIGURE 3). The counter section of the control register contains a registration of the number of subtraction operations to be performed in the division and this number is reduced by one by each end of word pulse on line 95. The trigger 99 provides a delayed end of word pulse which opens gate 97 to allow setting of the sign trigger 92 in dependence upon the sign of the partial remainder. The delayed end of word pulse is also applied through amplifier 114 to zero the first stage of the M register over line P39, and to open gate 84 to allow the carry trigger 63 to be set in accordance with the setting of the last stage of the B register.

If the partial remainder is negative pulses received by gates 105 and 106 in the adder 62 (FIGURE 1) are applied to gates 115 and 116 respectively instead of to gates 108 and 109 and gate 90 (FIGURE 3) applies shift pulses to line P31 instead of line P5. Thus during the next subtraction operation the divisor is subtracted from the original divided shifted two positions left and the resultant partial remainder is entered in the A register while the shifted dividend is re-entered in the M register through gate 93.

The above description has dealt with all of the circuit operations which occur, or are likely to occur, in the process of division. For convenience the sequence which occurs during a division will now be briefly recapitulated. Initially the dividend is in A register 18 and the divisor, suitably shifted to make it exceed the dividend if necessary, is in the B register 20.

On the first operative cycle of the actual division sequence, the sign-indicating trigger 92 is assumed to be in its positive-indicating position. Therefore the contacts of the A register 18, i.e. the dividend, the Q register 19, in which the quotient will be built up, and the M register 17 all receive a set of 39 shift pulses while the B register 20 receives 40 shift pulses so that the contents (if any) of the A, Q and M registers are, relatively left shifted once. At the same time the contents of A and B registers are both applied to the adder/subtractor 62, now conditioned as a subtractor, so that the output from subtractor 62 represents the value of the dividend, reduced by the divisor. This reduced value is inserted into the A register in place of the dividend, which passes to the M register, where it replaces the previous contents thereof, if any. The sign of the new contents of the A register sets the sign trigger 92 to its first or its second state dependent on whether the difference in A is positive or negative. If this difference is positive 1 is entered into the Q register 19 in its least significant digit place and if negative 0 is so entered, as described in detail above. Also a pulse is applied to the control register 16 to reduce by one the number set up in sections 34–39 thereof. This number is the binary equivalent of the number of quotient digits to be calculated.

The operation on the next cycle occurs in exactly the same manner as just given, if the sign trigger 92 has been set to its positive-representing state. However, if the sign trigger was set to its negative-representing state, the divisor from the B register 20 is passed to the subtractor 62 as usual, but the other input to subtractor 62 is from the M register 17. Thus in this case the divisor (unshifted) is subtracted from the dividend after the latter has received two shifts. The new partial remainder from the subtractor 62 is entered into the A register 18 in place of the partial remainder already there, while the value read out of the M register 17 is re-inserted therein. Once again the sign trigger 92 tests to determine whether the contents of the A register is negative or positive, this controlling the next step in the sequence, and once again the number in the control register 16 is reduced by unity.

Operations continue as described above, and it will be seen that the quotient is built up digit-by-digit in the Q register until the counter in the control register zeroises, when the division is complete. The quotient is now in the Q register, and its absolute magnitude can be determined since it is known how many shifts of the divisor were performed (if any) before the actual division commenced, and also the value of the constant by which the operands were multiplied initially on insertion into the calculating machine.

As previously explained the switching of the machine from performance of one instruction to selection and performance of the next instruction is brought about by the unsetting of the coincidence trigger 28 by an end of word pulse through gates 202 and 56. The unsetting of this trigger produces a delayed end of word pulse from delay trigger 30 which passes through gate 32 to switch the control trigger 27, and over line 57 to open gates 58 and transfer the next instruction word address to the operative positions of the control register 16.

In a division operation, or in any other operation requiring repeated performance of a single instruction, gate 56 is maintained closed by the potential on matrix line 46W so that coincidence trigger 28 is not unset at the end of a subtraction operation and the machine goes on to repeat the subtraction operation in each succeeding cycle. With each cycle however the number registered in counter stages of the control register 16 is reduced by one until it becomes zero whereupon the counter section delivers an output pulse on line 123.

The pulse on line 123 is applied to a gate 121 (FIGURE 2) which is held open at this time by the potential on matrix line 46B and by the control trigger 27 so that the pulse passes through gate 121 to unset the coincidence trigger 28 in place of the end of word pulse inhibited by gate 56. Thus the division operation is terminated and the machine is conditioned to enter the next instruction into the control register.

Details of the principal function elements of FIGURES 1–3 are shown in FIGURES 4–8.

FIGURE 4 shows a gate circuit of the type indicated schematically by gate 202 of FIGURE 2 having alternative outputs which are rendered effective in accordance with the setting of a trigger 27. The gate comprises two double triodes V1 and V2 having a common cathode resistor 203. The right hand section of V1 serves to stabilize the operating potential of the cathodes by virtue of a fixed potential applied to the grid from a potentiometer formed by resistors 204 and 205 connected between a positive supply line 206 and an earth line 207. The left hand grid of V1 is connected via a resistor to a positive bias line 208 so that this section of the valve is normally conducting and the potential of the common cathode line is high. The grids *a* and *b* of V2 are controlled from trigger 27, but the normal stabilized cathode potential is such that whatever the setting of trigger 27, V2 does not conduct appreciably. Line 25 is connected to the lefthand grid V1 via a capacitor 209. On the occurrence of a negative-going pulse on lines 25, the left hand section of V1 is cut off and the cathode potential falls to such an extent that the section of V2 which has the highest potential grid is driven into conduction. The anodes of V2 are connected to the line 206 through the primaries of transformers 210*a* and 210*b* so that when one section of V2 conducts, an output pulse is obtained from the secondary of the corresponding transformer.

Modifications of this gate circuit provide all the other gates of FIGURE 2 with the exception of the coincidence gate 35 which is described in connection with FIGURE 5. Thus with only output A used and the input to grid *a* of V2 from trigger 27 replaced by one of the matrix lines 46 a gate of the type indicated by gates 47, 48 and 49 results. In this case the arrangement of potentials is such that the gate operates when there is a low trigger output on grid *b* and a high matrix line potential on grid *a*, the lowering of the common cathode potential by the pulse input causing the *a* section of V2 to conduct and produce an output pulse at A. With both grids *a* and *b* at low potential neither section conducts in response to the pulse input and with grid *a* low and grid *b* high the *b* section of V2 conducts but no output is taken from B.

The coincidence gate 35 involves a greater degree of modification of the gate circuit of FIGURE 4 and this is shown in FIGURE 5. In this figure the gate is shown as having an input stage V4, a coincidence stage V5 and an output stage V6 but it will be appreciated that the number of coincidence stages would in practice be more than one, in the case of gate 35 since there are four lines 34 and four lines 36 there would be four such stages. The effect of the coincidence stage, or of each when there is more than one, is to raise the common cathode potential above the fixed potential of the grid V6 regardless of the effect of the input pulse when there is non-coincidence and to leave the common cathode potential to follow the variations caused by the input pulse when there is coincidence.

The grids of V5 are connected via resistors 211 and lines 36 to the anodes of one stage of the counter 24 and also via resistors 212 and lines 34 to the anodes of the corresponding stage of the control register. The connection is such that when the settings of the two stages coincide, each grid of V5 is connected to one high potential anode and one low potential anode. In this condition, the potential of the common cathode line is such that a negative-going output from delay 37, differentiated by capacitor 209 and applied to V4, causes V6 to conduct, producing an output pulse from a transformer 224, thus indicating coincidence.

If one of the grids of V5 is connected over lines 36 and 34 to anodes which are both at a high potential (indicating non-coincidence), that section of the valve conducts heavily and the potential of the cathode line rises, cutting off V6 and so preventing the input pulse on V4 from producing an output from V6. The right hand section of V4 is controlled by the trigger 43 so that an output is obtainable from V6 only when the grids of the coincidence valves, one for each stage, are all controlled by one high and one low potential anode, and, in addition, the output from trigger 43 is low.

The delay trigger 37 comprises a double triode valve V11 (FIGURE 6) with opposite grids cross coupled by resistors 213. The resistor 213 connected to the left hand grid is shunted by a capacitor 214 so that the circuit operates as a mono-stable trigger. A pulse applied over a line 215 switches the trigger which returns to its original state after a delay determined by the time constant of the components 213 and 214. The output is taken from the right hand anode via a line 216.

Each stage of the counter 23, 24 comprises a double triode V8 (FIGURE 7) with opposite grids and anodes cross-coupled to operate as a conventional bistable trigger. The coupling consists of a resistor 217 and a capacitor 218 in parallel.

Input pulses from the previous stage on a line **219*a* are alternately negative-going and positive-going. In order that the trigger can be operated by the negative-going pulses only, the pulses are applied to the trigger through an input double diode V7, the anodes of which are connected one to each grid of V8. These negative pulses switch the trigger from one state to the opposite state. Positive input pulses are prevented from reaching the grids by virtue of the reverse impedance of the diodes V7. In the case of the first stage, the input to the trigger from gate 22** comprises negative pulses only, but V7 is retained as its use leads to more reliable triggering.

The cathodes of V7 are connected to the cathodes of V8 via a resistor 220 which has a value sufficiently high to prevent a positive input pulse from triggering V8 but permits capacitors 218 to discharge rapidly during switching. The output from the left hand anode of V8 is differentiated by a capacitor 221 and fed to the next stage over a line **219*b***.

The stages of the registers 16, 17, 18, 19 and 20 are all alike and differ from those of the counter in that the cross-coupling is purely resistive (FIGURE 8) and two lines are used to connect each stage to the next. These two lines are connected to the two cathodes of an input diode V9 and are also coupled via capacitors 222 to a line 223 over which shift pulses are supplied to the circuit. If the setting of the previous stage is the same as that of V10 a shift pulse on line 223 has no effect as the grid of the non-conducting valve is held negative by the corresponding input line. If the previous stage reverses the grid of the conducting section of V10 is connected via diode V7 to the anode of the conducting valve of the previous stage, so that the next shift pulse triggers V10 to its opposite state.

A relay tree of the type used in the track select switch 3 is described with reference to FIGURE 13–4 in "The design of switching circuits" by W. Keister, A. E. Ritchie and S. E. Washburn, published by D. Van Nostrand Company. The relays of stages 1, 2 and 3 in the above-mentioned reference correspond to those in the track select switch which are controlled by the anodes of the appropriate stages of the control register, the outputs being connected one to each head 1, the switch being of such a capacity as to provide the necessary sixty-two outputs, by the addition of more relays.

A function matrix of the type used for that bearing the reference 45 is described in "The selenium rectifier in digital computer circuits" by Booth and Holt, published in Electronic Engineering for August 1954.

What we claim is:

1. Electronic cyclically-operable calculating apparatus for performing division on numbers expressed in binary digital notation, which comprises a first shift register of *n* stages settable to represent a dividend value, a binary subtractor operatively connected to said first shift register so as to form an accumulator, sign-indicating means settable to a first or to a second state according as whether said first shift register contains a positive or a negative value, a shift pulse source which provides *n* shift pulses in each cycle of the apparatus, a divisor storage device settable to represent a divisor value, means operative on each cycle of the apparatus to read out from the divisor storage device to the subtractor signals in synchronism with the *n* shift pulses and representing the value to which said divisor storage device has been set, a second shift register also having *n* stages, means operative in each cycle to apply to the first and second shift registers a shift pulse train consisting of all of said *n*-shift pulses except the first, whereby the values in said shift registers are left-shifted by one stage with respect to said divisor value, first gating means responsive to said sign indicating means being in its first state at the beginning of a cycle to cause digit-representing signals to be applied from said first shift register both to said subtractor and to said second shift register in synchronism with said shift pulse train, so that at the end of the cycle said second shift register has been set to the value which, at the beginning of that cycle, was in said first shift register but with a relative left shift of one digit and the value in said first shift register has been reduced by the value of said divisor, second gaiting means responsive to said sign indicating means being in its second state at the beginning of a cycle to cause digit representing signals to be applied from said second shift register both to the subtractor and to an input of said second shift register in synchronism with said shift pulse train, so that at the end of the cycle said first shift register has been set to represent the value from said second shift register reduced by the value of said divisor and the value in said second shift register has been relatively left-shifted by one digit, a quotient store, and gating means controlled by said sign-indicating means and operative to set said quotient store in accordance with a different quotient digit on each cycle, whereby the formation of a dividend remainder and the shifting of the remainder relative to the divisor take place simultaneously.

2. Apparatus as claimed in claim 1, in which the quotient store comprises a third shift register of *n* stages to which said shift pulse train is applied, and includes means for re-circulating the contents of the third register under control of said shift pulse train, a second source of pulses providing a pulse at the end of each cycle and means operative to set the least significant stage of the third register under joint control of the sign indicating means and said second source of pulses.

3. Apparatus as claimed in claim 1, having a counter, means operative to pre-set the counter to a value representative of the number of quotient digits to be calculated, a second source of pulses providing a pulse at the end of each cycle, means for applying said pulses to operate the counter, means responsive to the registration of a predetermined value by the counter to generate an output pulse and means operated by the output pulse to render the shift pulse source inoperative.

4. Apparatus as claimed in claim 1, in which the divisor store comprises a further shifting register of $n$ stages and means for re-circulating the contents of said register under control of said $n$ shift pulses.

References Cited in the file of this patent

UNITED STATES PATENTS

| | | |
|---|---|---|
| 2,686,632 | Wilkinson | Aug. 17, 1954 |
| 2,701,095 | Stibitz | Feb. 1, 1955 |
| 2,703,201 | Woods-Hill | Mar. 1, 1955 |

FOREIGN PATENTS

| | | |
|---|---|---|
| 1,090,208 | France | Oct. 13, 1954 |

OTHER REFERENCES

Ordvac Manual, University of Illinois, Oct. 31, 1951.